(12) United States Patent
Hakola et al.

(10) Patent No.: US 8,731,590 B2
(45) Date of Patent: May 20, 2014

(54) RESOURCE ALLOCATION CONTROL

(75) Inventors: Sami-Jukka Hakola, Kempele (FI);
Timo Koskela, Oulu (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 233 days.

(21) Appl. No.: 13/114,524

(22) Filed: May 24, 2011

(65) Prior Publication Data
US 2012/0302272 A1    Nov. 29, 2012

(51) Int. Cl.
*H04B 7/00*    (2006.01)
(52) U.S. Cl.
USPC ........ 455/509; 455/343.4; 455/464; 455/450; 455/453; 455/516; 455/517; 370/329; 370/395.4
(58) Field of Classification Search
CPC ... H04W 4/00; H04W 72/04; H04W 72/0406; H04W 72/0413
USPC ........... 455/509, 343.4, 464, 450, 452.1, 453, 455/13.4, 63.1, 63.2, 434, 516, 517; 370/329, 318, 345, 395.4, 241
See application file for complete search history.

(56) References Cited

U.S. PATENT DOCUMENTS

| | | | | |
|---|---|---|---|---|
| 2009/0104916 A1* | 4/2009 | Rosa et al. | .......... | 455/453 |
| 2009/0219912 A1* | 9/2009 | Wengerter et al. | .......... | 370/345 |
| 2010/0120459 A1* | 5/2010 | Delaval | .......... | 455/509 |
| 2010/0281486 A1* | 11/2010 | Lu et al. | .......... | 718/104 |
| 2011/0038333 A1* | 2/2011 | Yl et al. | .......... | 370/329 |

FOREIGN PATENT DOCUMENTS

| | | |
|---|---|---|
| EP | 1 758 312 A1 | 2/2007 |
| GB | 2 448 762 A | 10/2008 |
| WO | WO 2011/079204 A1 | 2/2011 |

OTHER PUBLICATIONS

Radio Resource Management, "LTE for UMTS—OFDMA abd SC-FDMA Based Radio Access, Section 8.3 Admission Control and QoS Parameters", pp. 182-183.
GPP TS 36.331 V10.1.0 (Mar. 2011); Technical Specification; 3rd Generation Partnership Project;Technical Specification Group Radio Access Network;Evolved Universal Terrestrial Radio Access (E-UTRA); Radio Resource Control (RRC);Protocol Specification; (Release10). pp. 22-23.

(Continued)

*Primary Examiner* — Shaima Q Aminzay
(74) *Attorney, Agent, or Firm* — Stanton IP Law (57) ABSTRACT

There are provided measures for resource allocation control. Such measures may exemplarily include allocating resources based on a resource allocation assignment including at least an assignment of a resource allocation amount of granted resources for transmission to logical channels, for which data is available for transmission, according to a priority and a prioritized bit rate of each logical channel, and calculating a metric indicative of a result of the resource allocation in terms of at least one of requirements of the prioritized bit rates of the logical channels and the available data of the logical channels. Such measures may also exemplarily include receiving, from at least one device, a metric indicative of a result of resource allocation at said at least one device in terms of at least one of requirements of prioritized bit rates and available transmission data of logical channels, evaluating the received at least one metric with respect to a resource allocation assignment, and modifying the resource allocation assignment based on a result of the evaluation.

11 Claims, 8 Drawing Sheets

(56) References Cited

OTHER PUBLICATIONS

3GPP TS 36.321 V10.1.0 (Mar. 2011); Technical Specification;3rd Generation Partnership Project; Technical Specification Group Radio Access Network;Evolved Universal Terrestrial Radio Access (E-UTRA);Medium Access Control (MAC) protocol specification; (Release 10). pp. 24-25.

* cited by examiner

RESOURCE ALLOCATION CONTROL

FIELD OF THE INVENTION

The present invention relates to resource allocation control. More specifically, the present invention relates to measures (including methods, apparatuses and computer program products) for resource allocation control.

BACKGROUND

In the field of wireless communication systems, resource allocation and resource sharing represent important issues. This is particularly due to the fact that a band (i.e. frequency spectrum), on which resources are available for a specific communication or system, and thus the resources are limited. Therefore, available resources are to be commonly used by a plurality of communicating devices. Such common usage of resources may manifest in the common usage of logical channels or radio bearers between communicating devices.

As a first aspect in this regard, an amount of resources may be allocated or assigned (scheduled) for a number of communicating devices for their common use. In a cellular communication environment, this may be typically effected by an access node or base station for (groups of) terminals and other communicating devices in its coverage area, respectively.

As a second aspect in this regard, a sharing balance of resources may be allocated or assigned (scheduled) for communicating devices for defining their respective relation of the commonly allocated resources for their individual use. In a cellular communication environment, this may be effected by an access node or base station for (groups of) terminals and other communicating devices in its coverage area, respectively. Otherwise, in a network-controlled device-to-device (D2D) communication, wherein devices such as user equipments (UE) or terminals directly communicate with each other without involving a network entity such as an access node or base station or of a cellular communication network, this may also be effected in a coordinated manner between the communicating devices participating in a D2D communication.

However, in the field of wireless communication systems, it is a problem to provide for an appropriate and fair resource allocation control (e.g. for shared logical channels), particularly in terms of individual quality-of-service (QoS) configurations. Namely, it is problematic to ensure a resource allocation to communicating devices, including at least one of a resource allocation amount and a resource sharing balance, so as to comply with QoS settings and/or requirements of all logical channels involved in a certain communication.

Such problem is specifically relevant when the resource allocation amount is controlled by the network while the resource sharing balance is controlled by the communicating devices themselves.

In such case, it may for example hardly be prevented that a communicating device acts in a selfish manner compared to other communicating device, with which resources are shared. In other words, it may be problematic that, when the network configures QoS settings for logical channels to be commonly used by communicating devices (e.g. in a D2D or an uplink communication), the achievable and actually achieved bit rates of the logical channels cannot be properly controlled according to the configured QoS settings.

Further, in such case, an appropriate coordination of resource allocation and sharing may for example hardly be accomplished. In other words, it may be problematic how to exchange reliable parameters suitable for an appropriate and fair resource allocation and sharing between communicating devices. For example, when using buffer status as a parameter for balancing resource allocation between communicating devices, as conventionally proposed, this parameter may not reveal how used resource sharing of allocated radio resources corresponds to configured QoS settings for devices in a common D2D or uplink communication.

In view thereof, there is a problem in how to appropriately take into account specific characteristics relevant for resource allocation control (such as QoS settings of commonly used logical channels) in resource allocation control (e.g. for shared logical channels).

Thus, there is a need to further improve resource allocation control.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising obtaining a resource allocation assignment including at least an assignment of a resource allocation amount of granted resources for transmission, allocating resources out of the granted resources to logical channels, for which data is available for transmission, according to a priority and a prioritized bit rate of each logical channel, and calculating a metric indicative of a result of the resource allocation in terms of at least one of requirements of the prioritized bit rates of the logical channels and the available data of the logical channels.

For example, according to further developments or modifications thereof, the resource allocation may comprise a first round of allocating resources to the logical channels in a decreasing order of priority of each logical channel up to a prioritized bit rate of each logical channel, and the method may further comprise determining whether, as a result of the first round of resource allocation, the granted resources are sufficient for fulfilling the requirements of the prioritized bit rates or the available data of the logical channels. In this case, the metric calculation may comprise summing a data amount of the logical channels, which is not allocated by the first round of resource allocation, and which is necessary to be allocated for fulfilling the requirements of the prioritized bit rates or the available data of the logical channels, if it is determined that the granted resources are not sufficient.

For example, according to further developments or modifications thereof, if it is determined that the granted resources are sufficient as a result of the first round of resource allocation, the resource allocation may further comprise a second round of allocating resources, which are not allocated by the first round of resource allocation, to the logical channels in a decreasing order of priority of each logical channel. In this case, the metric calculation may comprise summing a data amount of the logical channels, which is allocated by the second round of resource allocation.

According to an exemplary aspect of the present invention, there is provided a method comprising providing, to at least one device involved in a transmission, a resource allocation assignment including at least an assignment of a resource allocation amount of granted resources for the transmission, receiving, from said at least one device, a metric indicative of a result of resource allocation at said at least one device in terms of at least one of requirements of prioritized bit rates and available transmission data of logical channels, evaluating the received at least one metric with respect to the resource allocation assignment, and modifying the resource allocation assignment based on a result of the evaluation, and providing, to said at least one device, the modified resource allocation assignment.

According to an exemplary aspect of the present invention, there is provided an apparatus comprising an interface configured for communication with at least another apparatus, and a processor configured to obtain, via the interface, a resource allocation assignment including at least an assignment of a resource allocation amount of granted resources for transmission, allocate resources out of the granted resources to logical channels, for which data is available for transmission, according to a priority and a prioritized bit rate of each logical channel, and calculate a metric indicative of a result of the resource allocation in terms of at least one of requirements of the prioritized bit rates of the logical channels and the available data of the logical channels.

For example, according to further developments or modifications thereof, the processor may be configured to perform a first round of allocating resources to the logical channels in a decreasing order of priority of each logical channel up to a prioritized bit rate of each logical channel, and to determine whether, as a result of the first round of resource allocation, the granted resources are sufficient for fulfilling the requirements of the prioritized bit rates or the available data of the logical channels. In this case, the processor may be further configured sum, for metric calculation, a data amount of the logical channels, which is not allocated by the first round of resource allocation, and which is necessary to be allocated for fulfilling the requirements of the prioritized bit rates or the available data of the logical channels, if it is determined that the granted resources are not sufficient.

For example, according to further developments or modifications thereof, if it is determined that the granted resources are sufficient as a result of the first round of resource allocation, the processor may be configured to perform a second round of allocating resources, which are not allocated by the first round of resource allocation, to the logical channels in a decreasing order of priority of each logical channel. In this case, the processor may be further configured to sum, for metric calculation, a data amount of the logical channels, which is allocated by the second round of resource allocation.

According to an exemplary aspect of the present invention, there is provided an apparatus comprising an interface configured for communication with at least another apparatus, and a processor configured to provide, to at least one device involved in a transmission via the interface, a resource allocation assignment including at least an assignment of a resource allocation amount of granted resources for the transmission, receive, from said at least one device via the interface, a metric indicative of a result of resource allocation at said at least one device in terms of at least one of requirements of prioritized bit rates and available transmission data of logical channels, evaluate the received at least one metric with respect to the resource allocation assignment, and modify the resource allocation assignment based on a result of the evaluation, and provide, to said at least one device via the interface, the modified resource allocation assignment.

According to an exemplary aspect of the present invention, there is provided a computer program product comprising computer-executable components which, when the program is run on a computer, are configured to execute a method according to any one of the above-described aspects. By way of exemplary embodiments of the present invention, there is provided resource allocation control. More specifically, by way of exemplary embodiments of the present invention, there are provided measures and mechanisms for resource allocation control (which may for example be applicable for shared logical channels).

Thus, improvement is achieved by methods, devices and computer program products enabling resource allocation control.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present are is described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following exemplary description mainly refers to specifications being used as non-limiting examples for certain exemplary network configurations and deployments. In particular, for the applicability of thus described exemplary aspects and embodiments, LTE- (including LTE-Advanced-) related cellular communication networks are used as non-limiting examples. As such, the description of exemplary aspects and embodiments given herein specifically refers to terminology which is directly related thereto. Such terminology is only used in the context of the presented non-limiting examples, and does naturally not limit the invention in any way. Rather, any other communication systems, bands, network configurations or system deployments, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for resource allocation control (which may for example be applicable for shared logical channels).

Figure 1:
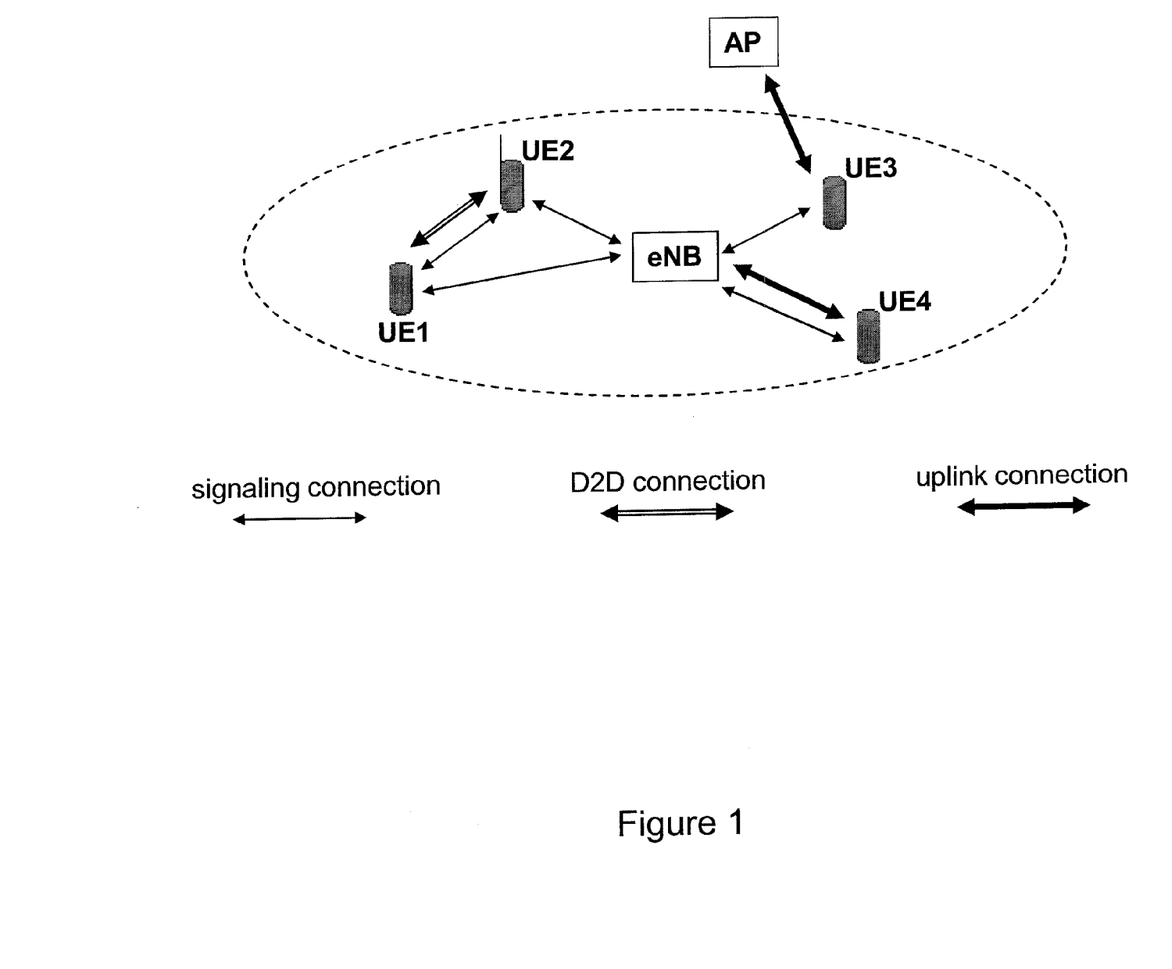
FIG. 1 shows a schematic diagram of an exemplary deployment scenario for which exemplary embodiments of the present invention are applicable.

FIG. 1 shows a schematic diagram of an exemplary deployment scenario for which exemplary embodiments of the present invention are applicable.

As shown in FIG. 1, it may be exemplarily assumed that four terminals UE1, UE2, UE3 and UE4 reside in a cell (illustrated by a dashed line) of a cellular communication network, such as e.g. a LTE network. An eNB represents an access node or base station of the communication network, which controls the served terminals in its coverage area. The terminals UE1 to UE4 are capable of communicating via the cellular communication network, i.e. via the eNB, and the terminal UE4 is also capable of communicating via a local area network, such as a WLAN, an access point of which is denoted by AP.

According to the non-limiting exemplary scenario of FIG. 1, the terminals UE1 and UE2 may establish a (network/eNB-controlled) D2D communication between each other, the terminal may established a (network/eNB-controlled) uplink communication with a WLAN access point (which may serve as for cellular offloading purposes, for example), and the terminal UE4 may establish a (network/eNB-controlled) uplink communication with the cellular communication network such as the LTE. The D2D communication may be established on a licensed band/spectrum (of the cellular communication network such as the LTE) or an unlicensed band/spectrum, the uplink WLAN communication may be established on an unlicensed band/spectrum (of the WLAN), and the uplink cellular communication may be established on a licensed band/spectrum (of the cellular communication network such as the LTE). In order to establish and operate such communications, signaling procedures could be performed over the illustrated signaling connections.

An unlicensed band may be located on one or more of the 2.4 GHz range, the 6 GHz range, any sub-gigahertz ISM range, and the local area network may be based on any IEEE802.11 specification (including e.g. 802.11ah, 802.11af, 802.11ac, and the like).

In the following, exemplary embodiments of the present invention are described with reference to methods, procedures and functions, as well as with reference to structural arrangements and configurations.

For facilitating a better understanding of the present teaching, the following considerations are given in terms of QoS settings and prioritization of logical channel, upon which the present invention and its exemplary embodiments are based.

In present 3GPP specifications such as for LTE, a QoS parameter called the Prioritized Bit Rate (PBR) is specified for an uplink communication per radio bearer. The PBR the data rate provided to one logical channel before allocating any transmission resource to a lower-priority logical channel. The PBR is introduced to avoid a so-called uplink scheduling starvation problem that may occur for a terminal with multiple configured radio bearers. The PBR is not necessarily related to a Guaranteed Bit Rate (GBR) parameter signaled via the S1 interface to the eNB, i.e. a PBR can also be defined for non-GBR radio bearers.

Accordingly, a rate control functionality per bearer is introduced for sharing of uplink resources between radio bearers. The uplink rate control function may be controlled (e.g. by the RRC) by giving each bearer a priority and a PBR. The uplink rate control function ensures that each terminal handles its radio bearer(s) such that all the radio bearer(s) are firstly served in decreasing priority order up to their respective PBR, and all the radio bearer(s) are subsequently served in decreasing priority order for the remaining resources.

Figure 2:
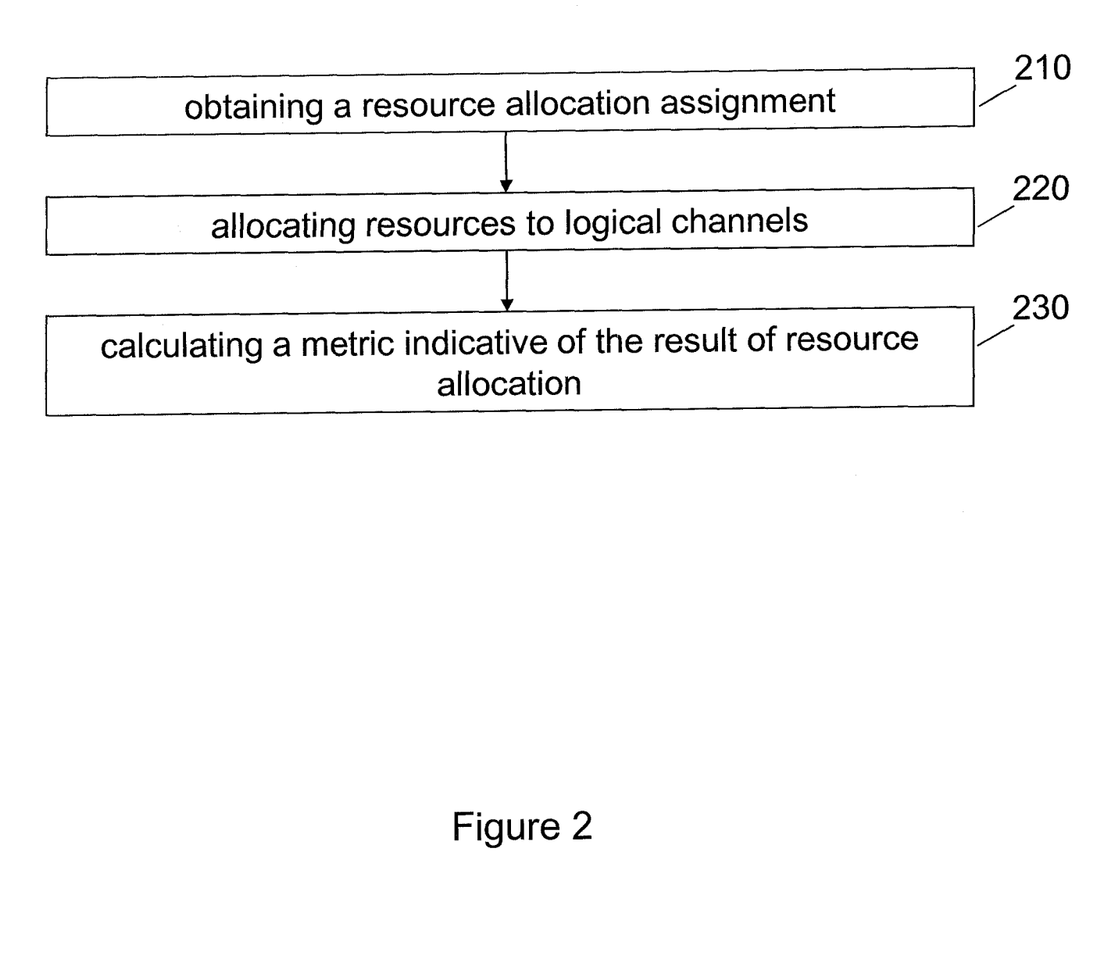
FIG. 2 shows a flowchart illustrating an example of a procedure which is operable at or by a terminal according to exemplary embodiments of the present invention.

FIG. 2 shows a flowchart illustrating an example of a procedure which is operable at or by a terminal according to exemplary embodiments of the present invention.

As shown in FIG. 2, a procedure according to exemplary embodiments of the present invention may comprise an operation (210) of obtaining a resource allocation assignment including at least an assignment of a resource allocation amount of granted resources for transmission, an operation (220) of allocating resources out of the granted resources to logical channels, for which data is available for transmission, according to a priority and a prioritized bit rate of each logical channel, and an operation (230) of calculating a metric indicative of a result of the resource allocation in terms of at least one of requirements of the prioritized bit rates of the logical channels and the available data of the logical channels.

According to exemplary embodiments of the present invention, the resource allocation assignment may comprise, in addition to or instead of the an assignment of a resource allocation amount of granted resources for transmission (pertaining to a potential first stage of resource allocation), an assignment of a resource sharing balance of granted resources between devices involved in the transmission (pertaining to a potential second stage of resource allocation).

According to exemplary embodiments of the present invention, the resource allocation operation may comprise a first round of allocating resources to the logical channels in a decreasing order of priority of each logical channel up to a prioritized bit rate of each logical channel or said first round of allocating resources together with a second round of allocating resources, which are not allocated by the first round of resource allocation, to the logical channels in a decreasing order of priority of each logical channel.

According to exemplary embodiments of the present invention, the calculated (terminal-side) metric may be provided between a terminal/device and a network entity such as an access node or base station for the access node or base station to be able to make possible corrective actions related to a first stage of resource allocation and/or a second stage resource sharing among the devices, and/or between two terminals/devices for them to be able to make a pair-wise re-allocation in second stage resource sharing.

According to exemplary embodiments of the present invention, the calculated (terminal-side) metric may specifically be sent (either proactively or periodically or upon request or query) to an access node or base station of the serving cell of a cellular communication network (from which the resource allocation assignment may have been received beforehand). Then, a modified resource allocation assignment, including at least one of an assignment of a resource allocation amount of granted resources for transmission and an assignment of a resource sharing balance of granted resources between devices involved in the transmission, may be received from the access node or base station of the serving cell, and the subsequent resource allocation (for D2D or UL communications) may be effected based on the modified resource allocation assignment.

According to exemplary embodiments of the present invention, the calculated (terminal-side) metric may specifically be sent to a device, i.e. another terminal, involved in a D2D communication with which the transmission is related. Then, a modified resource allocation assignment, including an assignment of a resource sharing balance of granted resources with said device, may be obtained from said device, i.e. terminal. The subsequent resource allocation (for D2D communications) may then be effected based on the modified resource allocation assignment. Additionally or alternatively, a corresponding (terminal-side) metric of said device may be received from said device, a modified resource allocation assignment, including an assignment of a resource sharing balance of granted resources with said device based on the calculated metric and the received metric, may be locally established and provided to said device. The subsequent resource allocation (for D2D communications) may then be effected based on the modified resource allocation assignment both the terminal in question and the other terminal in communication.

Figure 3:
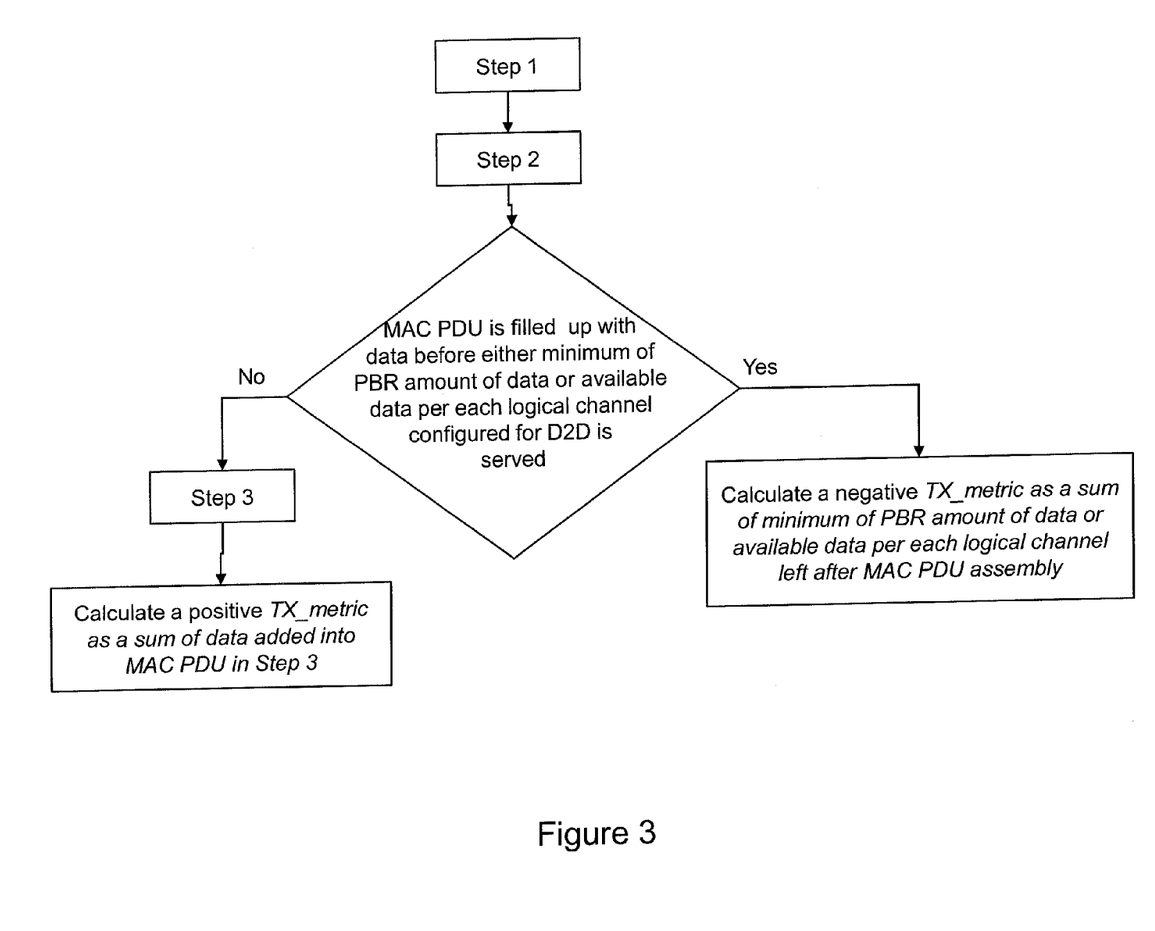
FIG. 3 shows a flowchart illustrating an example of a metric calculation procedure which is operable at or by a terminal according to exemplary embodiments of the present invention.

FIG. 3 shows a flowchart illustrating an example of a metric calculation procedure which is operable at or by a terminal according to exemplary embodiments of the present invention.

The exemplary procedure according to FIG. 3 is based on a MAC PDU assembly and multiplexing operation exhibiting a functionality of logical channel prioritization.

Such logical channel prioritization in MAC PDU assembly and multiplexing, upon which exemplary embodiments of the present invention are based, is applicable when a new transmission is (to be) performed.

Specifically, scheduling of data (such as D2D and/or uplink transmission data) may be controlled (e.g. by RRC) on the basis of, at least, a priority and a prioritized bit rate, which parameters may be signaled and assigned for each logical channel on which data is to be transmitted.

Each terminal (UE) shall maintain a variable Bj for each logical channel j. The variable Bj shall be initialized to zero when the related logical channel is established, and shall be incremented by the product PBR×TTI duration for each TTI, where PBR is the prioritized bit rate of logical channel j. The value of Bj can be negative but shall never exceed a bucket size and, if the value of Bj is larger than the bucket size of logical channel j, it shall be set to the bucket size. The bucket size of a logical channel is equal to the product PBR×BSD, where BSD is the bucket size duration of logical channel j, and PBR and BSD are configurable by upper layers.

According to exemplary embodiments of the present invention, the terminal may perform a logical channel prioritization procedure in MAC PDU assembly and multiplexing when a new transmission is (to be) performed.

In a first round of resource allocation, as denoted by Step 1 in FIG. 3, resources are allocated to logical channels, for which data is available for transmission, in a decreasing order of priority of each logical channel up to the prioritized bit rate of each logical channel. That is, all the logical channels with Bj>0 are allocated resources in a decreasing priority order. If the PBR of a logical channel (or radio bearer) is set to "infinity", the terminal shall allocate resources for all the data that is available for transmission on the radio bearer before meeting the PBR of the lower priority radio bearer(s). Thereafter, as denoted by Step 2 in FIG. 3, the terminal shall decrement the value of Bj by the total size of MAC SDUs (i.e. the allocatable size or payload of the MAC PDU) served to logical channel j in Step 1 above.

After the first round of resource allocation, it is determined (discriminated) whether, as a result of the first round of resource allocation, the granted resources are sufficient for fulfilling the requirements of the prioritized bit rates or the available data of the logical channels. That is, it may be determined (discriminated) whether the MAC PDU is filled up with data before either a minimum of PBR amount of data or available data per each logical channel is served.

According to exemplary embodiments of the present invention, the requirements of the prioritized bit rates or the available data of the logical channels may be fulfilled when the prioritized bit rate is provided for each logical channel where the available data for transmission equals or exceeds a data amount according to the prioritized bit rate, and all of the available data is allocated for each logical channel where a data amount according to the prioritized bit rate exceeds the available data for transmission.

If the determination (discrimination) is affirmative, i.e. the granted resources are insufficient for fulfilling the requirements of the prioritized bit rates or the available data of the logical channels, a metric (denoted as TX_metric) is calculated which is indicative of a result of the resource allocation in terms of at least one of requirements of the prioritized bit rates of the logical channels and the available data of the logical channels. According to exemplary embodiments of the present invention, the metric may in this case be calculated by summing a data amount of the logical channels, which is not allocated by the first round of resource allocation, and which is necessary to be allocated for fulfilling the requirements of the prioritized bit rates or the available data of the logical channel.

If the determination (discrimination) is negative, i.e. the granted resources are sufficient for fulfilling the requirements of the prioritized bit rates or the available data of the logical channels, the procedure proceeds as follows.

In a second round of resource allocation, as denoted by Step 3 in FIG. 3, resources, which are not allocated by the first round of resource allocation, are allocated to logical channels, for which data is still available for transmission, in a decreasing order of priority of each logical channel. That is, if any resources remain, all the logical channels are served in a strict decreasing priority order (regardless of the value of Bj) until either the data for that logical channel or the resource assignment (i.e. the allocatable size or payload of the MAC PDU) is exhausted, whichever comes first. Logical channels configured with equal priority should be served equally in this round.

After the second round of resource allocation, a metric (denoted as TX_metric) is calculated which is indicative of a result of the resource allocation in terms of at least one of requirements of the prioritized bit rates of the logical channels and the available data of the logical channels. According to exemplary embodiments of the present invention, the metric may in this case be calculated by summing a data amount of the logical channels, which is allocated by the second round of resource allocation, i.e. an aggregated data amount of Step 3.

According to exemplary embodiments of the present invention, the aforementioned metric (TX_metric) may be applicable for any one of a D2D communication between terminals, thus representing a D2D_metric, and an uplink communication between a terminal and a network entity such as an access node or base station of a cellular communication network (e.g. eNB of LTE) or an access point of a local are network (e.g. AP of WLAN), thus representing an UL_metric.

According to exemplary embodiments of the present invention, the metric calculation may be based on the thus calculated data amount, and may for example additionally comprise averaging the summed data amount of the logical channels and/or forming a ratio of the (averaged) summed data amount with an amount of the granted resources.

According to exemplary embodiments of the present invention, during each (D2D or UL) transmission (or preparation thereof) and respective MAC PDU assembly and multiplexing, the terminal may calculate the sum of data amounts as outlined above, while, in parallel, the terminal may keep up to date an average value of those sum values over a number of preceding (D2D or UL) transmissions. For example, such average may be taken over some certain time period or by using a moving average filter, where new_average_value=(1−alfa)×value_of_current_transmission+alfa×old_average_value holds. The length of averaging may be controlled (optimized) by the network so as to properly balance the accuracy of control and required signaling between the communicating devices (including e.g. UEs and eNB/AP).

Figure 4:
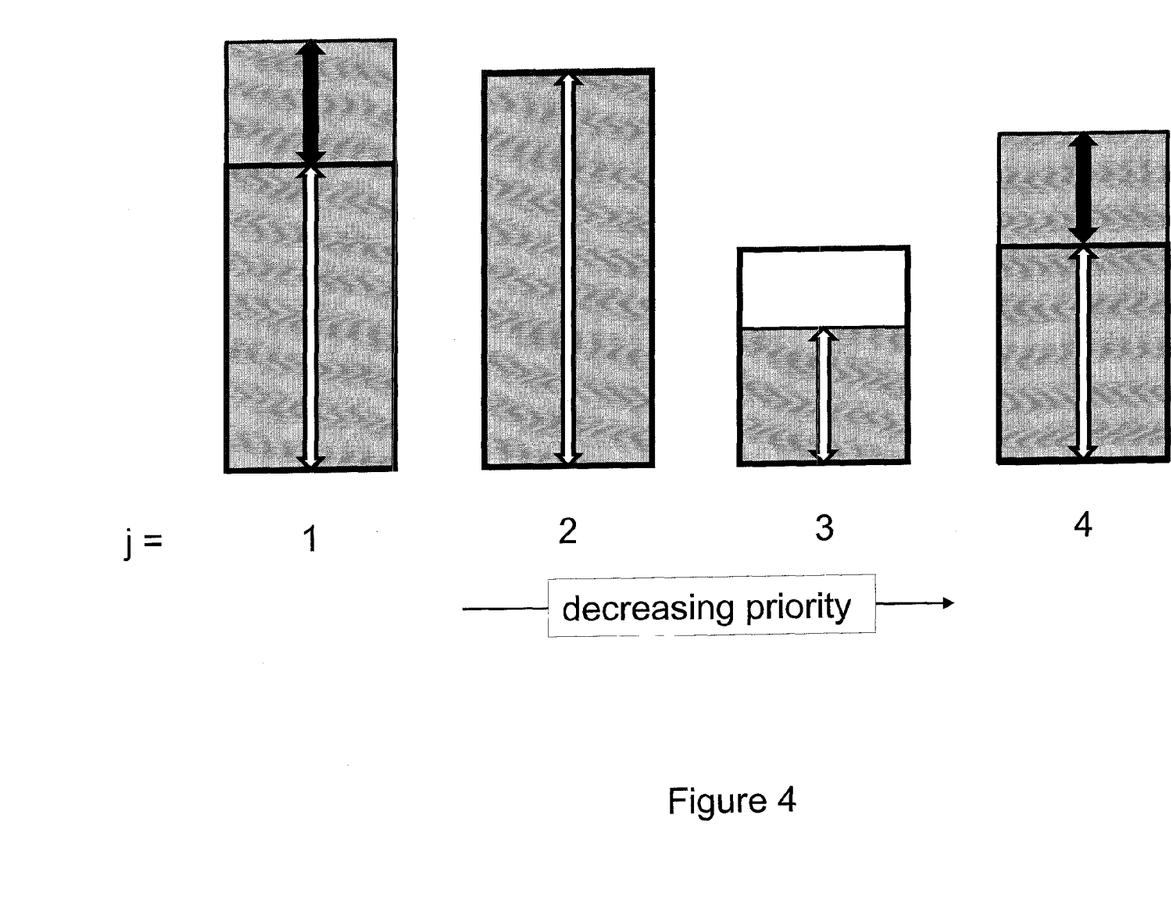
FIG. 4 shows a schematic diagram for explaining a relation between data amounts of transmission data and data amounts according to prioritized bit rates and allocated bit rates in case of sufficiency of available resources for a resource allocation control according to exemplary embodiments of the present invention.
Figure 5:
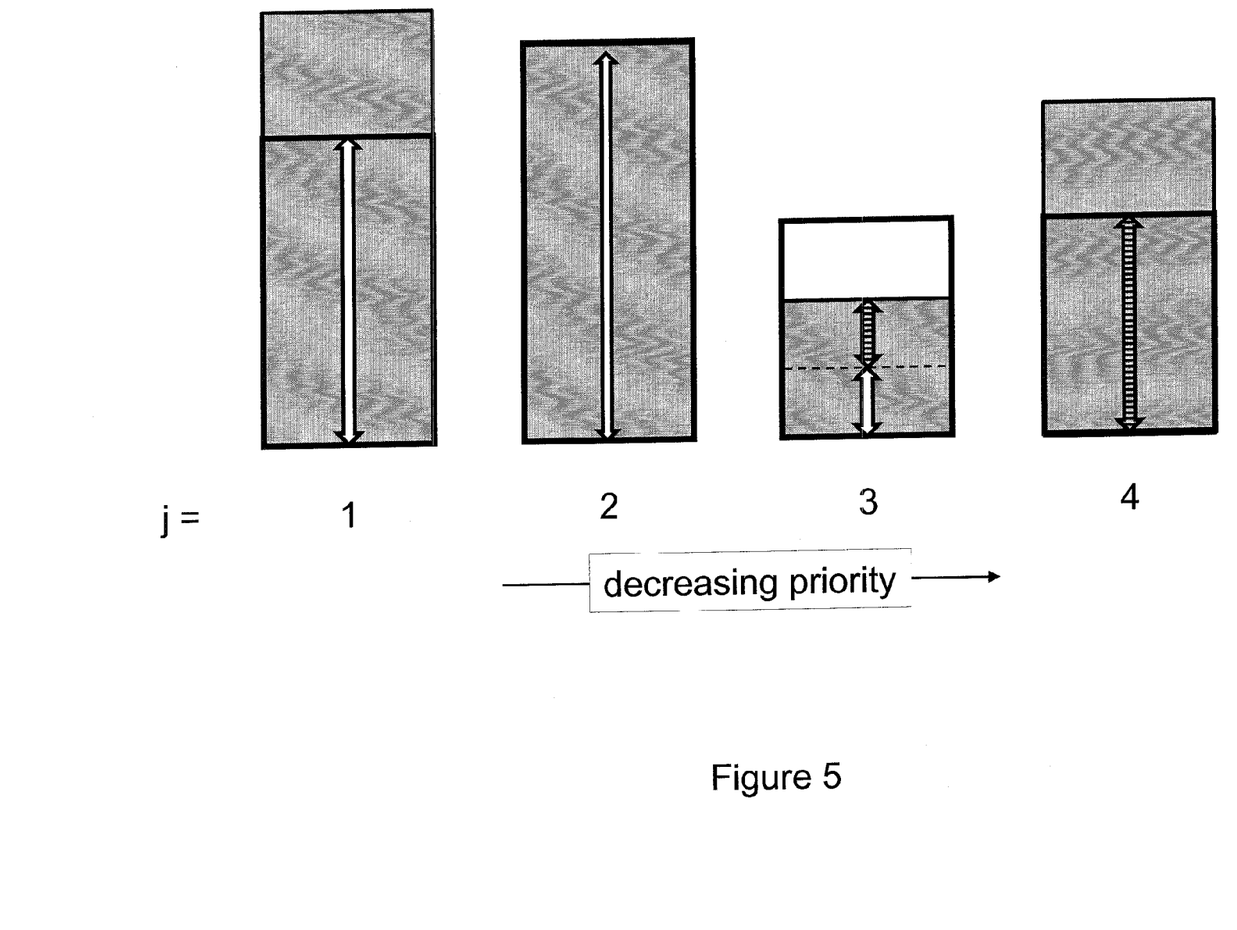
FIG. 5 shows a schematic diagram for explaining a relation between data amounts of transmission data and data amounts according to prioritized bit rates and allocated bit rates in case of insufficiency of available resources for a resource allocation control according to exemplary embodiments of the present invention.

Reference is made to FIGS. 4 and 5 for explaining details of metric calculation according to exemplary embodiments of the present invention.

In FIGS. 4 and 5, for each of a number of four logical channels (j=1 . . . 4) each having a predetermined priority, a PBR requirement is illustrated by a box with a thick black line, and a data amount or bit rate for transmission is illustrated by a grey square.

FIG. 4 shows a schematic diagram for explaining a relation between data amounts of transmission data and data amounts according to prioritized bit rates and allocated bit rates in case of sufficiency of available resources for a resource allocation control according to exemplary embodiments of the present invention. That is, FIG. 4 represents a configuration according to a negative determination (discrimination) in the procedure of FIG. 3.

The white block arrows indicate resources allocated in the first round of resource allocation (i.e. in Step 1 of FIG. 3), and the black block arrows indicate resources allocated in the second round of resource allocation (i.e. in Step 3 of FIG. 3). As evident from FIG. 4, no requirements of prioritized bit rates or available transmission data remain after the two rounds of resource allocation. The metric according to exemplary embodiments of the present invention will be positive, and the (absolute) value thereof will be in relation to the (sum of) lengths of the black block arrows. As indicated above, such length-related sum may also be averaged and/or used for forming a ratio with an amount of the granted resources, e.g. the (sum of) lengths of the black and white block arrows.

FIG. 5 shows a schematic diagram for explaining a relation between data amounts of transmission data and data amounts according to prioritized bit rates and allocated bit rates in case of insufficiency of available resources for a resource allocation control according to exemplary embodiments of the present invention. That is, FIG. 5 represents a configuration according to an affirmative determination (discrimination) in the procedure of FIG. 3.

The white block arrows indicate resources allocated in the first round of resource allocation (i.e. in Step 1 of FIG. 3), and the grey horizontal-line block arrows indicate resources which are not allocated in the first round of resource allocation, i.e. the resources which would still need to be allocated for fulfilling the PBR requirements of the logical channels. As evident from FIG. 5, requirements of prioritized bit rates remain for logical channels 3 and 4. The metric according to exemplary embodiments of the present invention will be negative, and the (absolute) value thereof will be in relation to the (sum of) lengths of the grey horizontal-line block arrows. As indicated above, such length-related sum may also be averaged and/or used for forming a ratio with an amount of the granted resources, e.g. the (sum of) lengths of the white block arrows.

Figure 6:
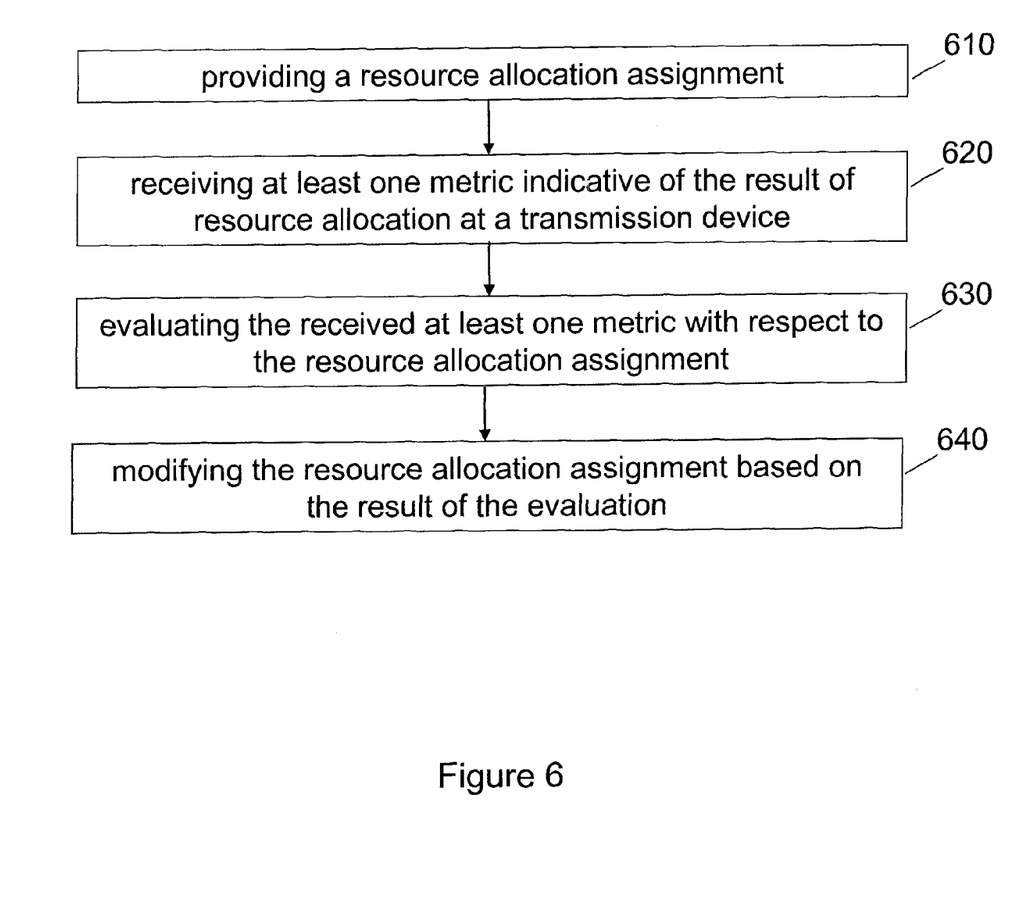
FIG. 6 shows a flowchart illustrating another example of a procedure which is operable at or by a network entity according to exemplary embodiments of the present invention.

FIG. 6 shows a flowchart illustrating another example of a procedure which is operable at or by a network entity, e.g. an eNB, according to exemplary embodiments of the present invention.

As shown in FIG. 6, a procedure according to exemplary embodiments of the present invention may comprise an operation (610) of providing, to at least one device involved in a transmission, i.e. a terminal, a resource allocation assignment including at least an assignment of a resource allocation amount of granted resources for the transmission, an operation (620) of receiving, from said at least one device, a metric indicative of a result of resource allocation at said at least one device in terms of at least one of requirements of prioritized bit rates and available transmission data of logical channels, an operation (630) of evaluating the received at least one metric with respect to the resource allocation assignment, and an operation (640) of modifying the resource allocation assignment based on a result of the evaluation, and providing, to said at least one device, the modified resource allocation assignment.

According to exemplary embodiments of the present invention, the metric evaluation and corresponding resource allocation assignment modification may be related to a first stage of resource allocation, i.e. the assignment of a resource amount to one or more terminals (for D2D or UL communications), and/or a second stage of resource allocation, i.e. the assignment of a resource sharing balance between at least two terminals (for D2D or UL communications).

That is, upon receiving the metrics from plural (in particular, two) devices, the eNB may assess the compliance of a presently achievable resource allocation with the QoS settings of the involved logical channel or channels. Namely, the eNB is able notice a possible unbalance in the achieved QoS of configured logical channels (or radio bearers) by individual devices e.g. in a D2D communication, and/or an excessive amount of resources or insufficient amount of resources assigned to the plural (in particular, two) devices as a whole. The eNB can then react either by re-allocating more or less radio resources for the devices as a whole or sending a relative resource sharing message to command the current resource sharing conditions between the devices to be changed according to given relative amount.

Accordingly, exemplary embodiments of the present invention provide for a mechanism for the serving network entity to control how well QoS is provided (QoS settings are satisfied) in overall resource allocation (of first stage) as well as in shared resource allocation (of second stage) in which the network entity may or may not be directly involved.

According to exemplary embodiments of the present invention, relating to a first stage of resource allocation, the metric evaluation may comprise adding all received metrics and basing the modification on the thus resulting sum of metrics. If the sum is negative, which indicates that not enough resources are available for the one or more terminals, the resource allocation amount of granted resources for the transmission may be increased. Otherwise, if the sum is positive and larger than a predetermined threshold, which indicates that (more than) enough resources are available for the one or more terminals, the resource allocation amount of granted resources for the transmission may be decreased.

According to exemplary embodiments of the present invention, relating to a second stage of resource allocation, the metric evaluation may comprise forming an absolute value of a difference between two received metrics of a pair of terminals involved in a (D2D) transmission. If the absolute value is larger than a predetermined threshold, an assignment of a resource sharing balance of granted resources for the device with the lower metric may be increased while an assignment of the resource sharing balance of granted resources for the device with the higher metric may be decreased. Thereby, the resource sharing relation between the devices may be balanced. If the absolute value is smaller than a predetermined threshold, no action is required, since it is assumed that the resource sharing relation between the devices is appropriately balanced.

Figure 7:
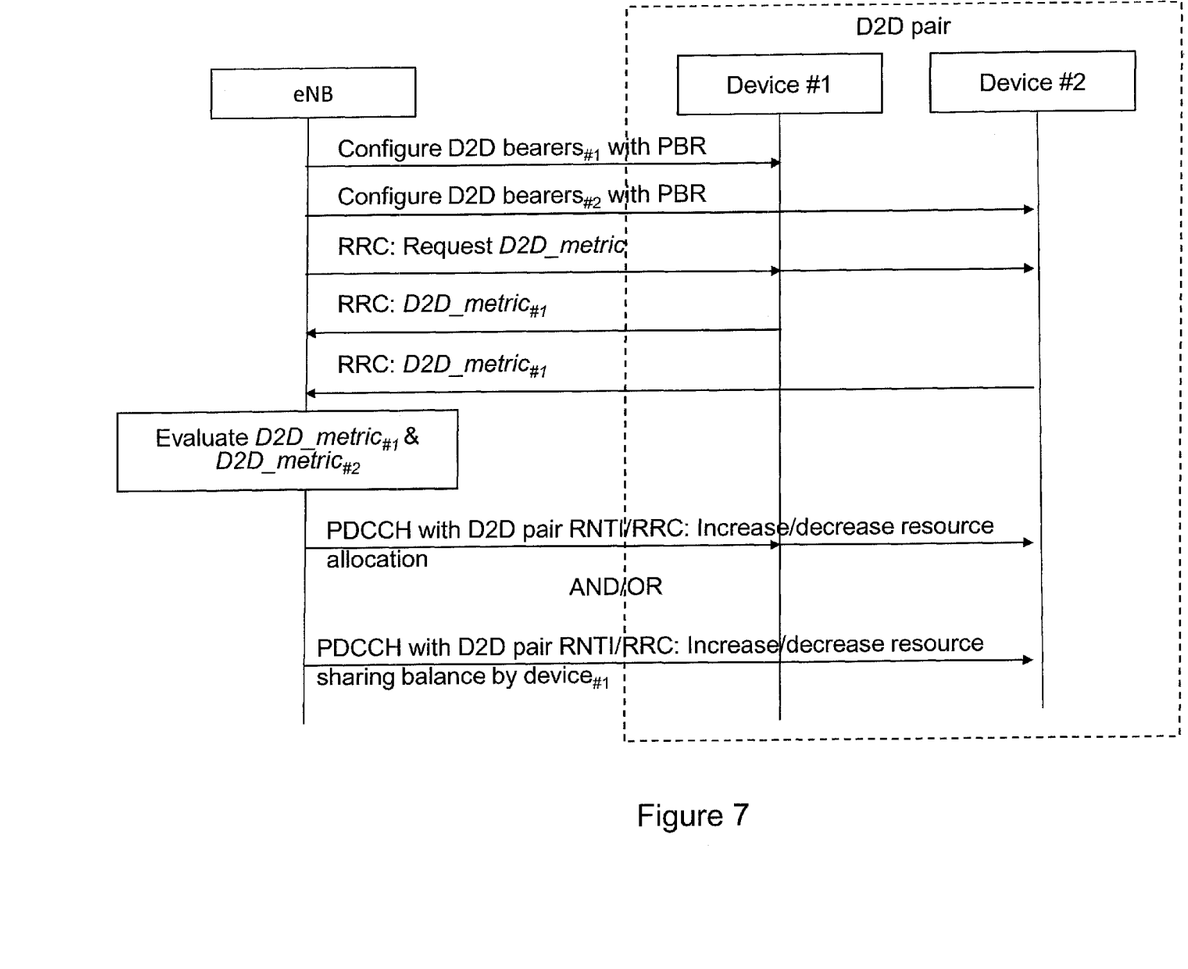
FIG. 7 shows a signaling diagram of an exemplary procedure according to exemplary embodiments of the present invention.

FIG. 7 shows a signaling diagram of an exemplary procedure according to exemplary embodiments of the present invention.

In FIG. 7, there is exemplarily assumed a scenario in which two devices represent a D2D pair, i.e. the relevant transmission, for which resources are to be allocated, relates to a D2D communication between Device#1 and Device#2. Yet, it is to be noted that another scenario may be equally conceived and applied accordingly. For example, the two devices may be two terminals trying to transmit UL data on respective UL transmissions to the eNB using a commonly assigned resource pool.

As shown in FIG. 7, the eNB may configure corresponding (D2D) bearers (or logical channels) to the two devices involved in the respective transmission. Such configuration may comprise a corresponding resource allocation assignment and setting data of the respective logical channel or channels, respectively. Upon request from the eNB, the two devices may report their corresponding metrics (exemplarily denoted as D2D_metrics here) to the eNB. Depending on the outcome of an evaluation of the two received metrics, the eNB may be provided with correspondingly modified resource allocation assignments, respectively. Such modified resource allocation assignment may relate to the resource amount for both devices, which is to be signaled to both devices, and/or the resource sharing balance between the two devices, which is to be signaled to at least one of the two devices.

As mentioned above, according to exemplary embodiments of the present invention, the metrics of the individual devices may also exchanged between the devices as such without involving the eNB or the like.

While the signaling according to FIG. 7 is exemplarily illustrated as being based on the RRC layer, the present invention and its exemplary embodiments are not limited thereto but any conceivable way of signaling is equally applicable. Also, the use of the PDCCH as well as the use of the RNTI for providing a (modified) resource allocation assignment is construed to represent a non-limiting example.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 8, while for the sake of brevity reference is made to the detailed description of respective corresponding methods and operations according to FIGS. 2, 3, 6, and 7 as well as the underlying deployment according to FIG. 1.

Figure 8:
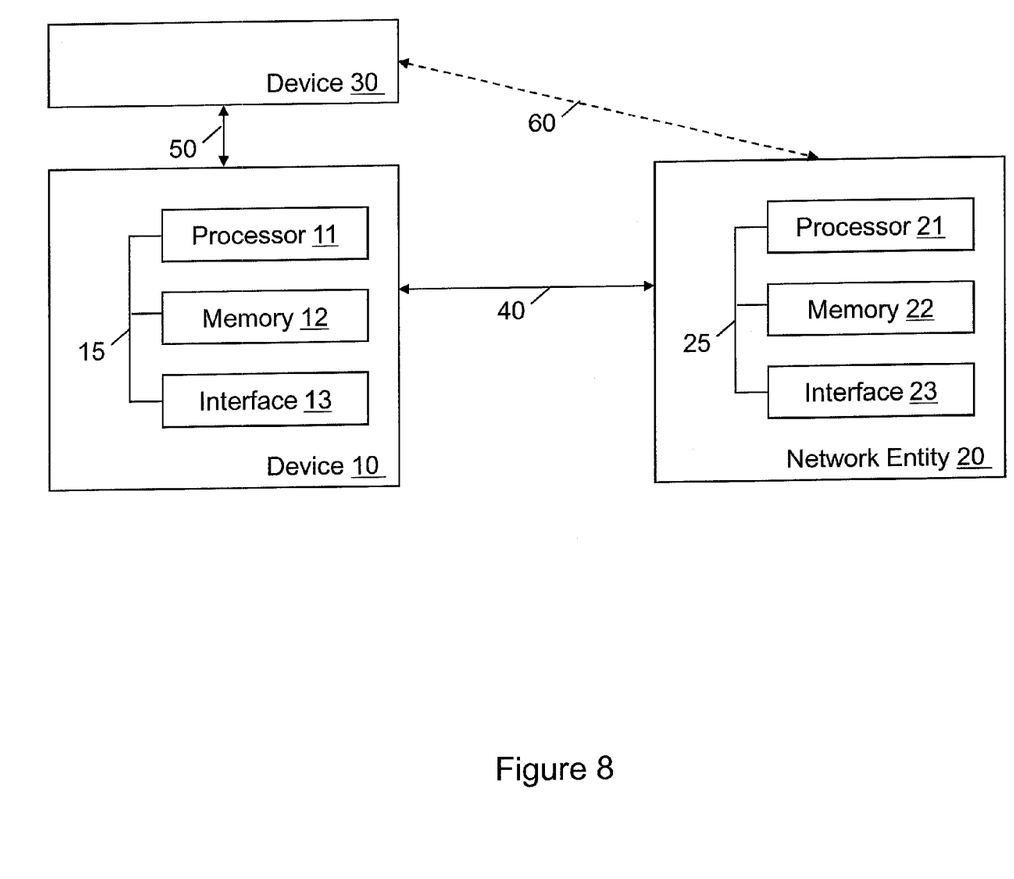
FIG. 8 shows a block diagram illustrating exemplary apparatuses according to exemplary embodiments of the present invention.

In FIG. 8 below, which is noted to represent a simplified block diagram, the solid line blocks are basically configured to perform respective operations as described above. The entirety of solid line blocks are basically configured to perform the methods and operations as described above, respectively. With respect to FIG. 8, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 8, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 8 shows a block diagram illustrating exemplary apparatuses according to exemplary embodiments of the present invention.

In view of the above, the thus described apparatuses 10 and 20 (and 30) are suitable for use in practicing the exemplary embodiments of the present invention, as described herein. The thus described apparatus 10 (or 30) may represent a (part of a) device, terminal or user equipment UE, as described above, and may be configured to perform a procedure and/or exhibit a functionality as described in conjunction with any one of FIGS. 2, 3, and 7. The thus described apparatus 20 may represent a (part of a) network entity, i.e. base station or access node or controller, such as for example a NodeB, an eNB, a RNC, or the like, as described above, and may be configured to perform a procedure and/or exhibit a functionality as described in conjunction with any one of FIGS. 6 and 7.

As shown in FIG. 8, according to exemplary embodiments of the present invention, a device, terminal or user equipment 10 (or 30) comprises a processor 11, a memory 12, and an interface 13, which are connected by a bus 15 or the like, and a network entity 20 comprises a processor 21, a memory 22, and an interface 23, which are connected by a bus 25 or the like. The device, terminal or user equipment 10 may be connected with the network entity 20 through a link or connection 40, the device, terminal or user equipment 10 may be connected with the device, terminal or user equipment 30 through a link or connection 50, and the device, terminal or user equipment 30 may optionally be connected with the network entity 20 through a link or connection 60.

The memories 12 and 22 may store respective programs assumed to include program instructions that, when executed by the associated processors 11 and 21, enable the respective electronic device or apparatus to operate in accordance with the exemplary embodiments of the present invention. The processors 11 and 21 and/or the interfaces 13 and 23 may also include a modem or the like to facilitate communication over the (hardwire or wireless) link 30, respectively. The interfaces 13 and 23 may include a suitable transceiver coupled to one or more antennas or communication means for (hardwire or wireless) communications with the linked or connected device(s), respectively. The interfaces 13 and 23 are generally configured to communicate with another apparatus, i.e. the interface thereof.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

According to exemplary embodiments of the present invention, the interface 13 is configured for communication with at least another apparatus. The processor 11 is configured to obtain, via the interface 13, a resource allocation assignment including at least an assignment of a resource allocation amount of granted resources for transmission, to allocate resources out of the granted resources to logical channels, for which data is available for transmission, according to a priority and a prioritized bit rate of each logical channel, and to calculate a metric indicative of a result of the resource allocation in terms of at least one of requirements of the prioritized bit rates of the logical channels and the available data of the logical channels.

According to exemplary embodiments of the present invention, the processor 11 may be configured to perform a first round of allocating resources to the logical channels in a decreasing order of priority of each logical channel up to a prioritized bit rate of each logical channel, to determine whether, as a result of the first round of resource allocation, the granted resources are sufficient for fulfilling the requirements of the prioritized bit rates or the available data of the logical channels, and to sum, for metric calculation, a data amount of the logical channels, which is not allocated by the first round of resource allocation, and which is necessary to be allocated for fulfilling the requirements of the prioritized bit rates or the available data of the logical channels, if it is determined that the granted resources are not sufficient.

According to exemplary embodiments of the present invention, the processor 11 may be configured to perform a second round of allocating resources, which are not allocated by the first round of resource allocation, to the logical channels in a decreasing order of priority of each logical channel, and to sum, for metric calculation, a data amount of the logical channels, which is allocated by the second round of resource allocation.

According to exemplary embodiments of the present invention, the processor 11 may be configured to, for metric calculation, at least one of average the summed data amount of the logical channels and form a ratio with an amount of the granted resources.

According to exemplary embodiments of the present invention, the processor 11 may be configured to send, via the interface 13, the calculated metric to an access node 20, and to obtain, from the access node 20 via the interface 13, a modified resource allocation assignment including at least one of an assignment of a resource allocation amount of granted resources for transmission and an assignment of a resource sharing balance of granted resources between devices involved in the transmission.

According to exemplary embodiments of the present invention, the processor 11 may be configured to send, via the interface 13, the calculated metric to a device 30 involved in the transmission, and to obtain, from said device 30 via the interface 13, a modified resource allocation assignment including an assignment of a resource sharing balance of granted resources with said device According to exemplary embodiments of the present invention, the processor 11 may be configured to receive, from a device 30 involved in the transmission via the interface 13, the metric of said device, to establish a modified resource allocation assignment including an assignment of a resource sharing balance of granted resources with said device based on the calculated metric and the received metric, and to provide, via the interface 13, the modified resource allocation assignment to said device 30.

According to exemplarily embodiments of the present invention, the processor 11, the memory 12 and the interface 13 can be implemented as individual modules, chipsets or the like, or one or more of them can be implemented as a common module, chipset or the like.

According to exemplary embodiments of the present invention, the interface 23 is configured for communication with at least another apparatus. The processor 21 is configured to provide, to at least one device 10 involved in a transmission via the interface 23, a resource allocation assignment including at least an assignment of a resource allocation amount of granted resources for the transmission, to receive, from said at least one device 10 via the interface 23, a metric indicative of a result of resource allocation at said at least one device in terms of at least one of requirements of prioritized bit rates and available transmission data of logical channels, to evaluate the received at least one metric with respect to the resource allocation assignment, and to modify the resource allocation assignment based on a result of the evaluation, and provide, to said at least one device 10 via the interface 23, the modified resource allocation assignment.

According to exemplary embodiments of the present invention, the processor 21 may be configured to, for the metric evaluation, add all received metrics, and to, for the resource allocation assignment modification, increase the resource allocation amount of granted resources for the transmission according to the addition result, if the addition result is negative, and decrease the resource allocation amount of granted resources for the transmission according to the addition result, if the addition result is positive and larger than a predetermined threshold.

According to exemplary embodiments of the present invention, the processor 21 may be configured to, for the metric evaluation, form an absolute value of a difference between two received metrics of a pair of devices involved in the transmission, and to, for the resource allocation assignment modification, increase an assignment of a resource sharing balance of granted resources for the device with the lower metric and decrease an assignment of the resource sharing balance of granted resources for the device with the higher metric, if the absolute value is larger than a predetermined threshold.

According to exemplarily embodiments of the present invention, the processor 21, the memory 122 and the interface 23 can be implemented as individual modules, chipsets or the like, or one or more of them can be implemented as a common module, chipset or the like.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for resource allocation control. Such measures may exemplarily comprise allocating resources based on a resource allocation assignment including at least an assignment of a resource allocation amount of granted resources for transmission to logical channels, for which data is available for transmission, according to a priority and a prioritized bit rate of each logical channel, and calculating a metric indicative of a result of the resource allocation in terms of at least one of requirements of the prioritized bit rates of the logical channels and the available data of the logical channels. Such measures may also exemplarily comprise receiving, from at least one device, a metric indicative of a result of resource allocation at said at least one device in terms of at least one of requirements of prioritized bit rates and available transmission data of logical channels, evaluating the received at least one metric with respect to a resource allocation assignment, and modifying the resource allocation assignment based on a result of the evaluation.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP $3^{rd}$ Generation Partnership Project
BSD bucket size duration
BSR bucket status report
D2D device-to-device
eNB evolved node B
EPC evolved packet core
GBR guaranteed bit rate
IEEE Institute of Electrical and Electronic Engineers
ISM industrial scientific medical
LTE long term evolution
MAC medium access control
PBR prioritized bit rate
PDCCH Packet Data Control CHannel
PDU packet data unit
QoS quality of service
RNC radio network controller
RNTI radio network temporary identifier
RRC radio resource control
S1 interface to connect eNB to EPC
SDU service data unit
TTI transmission timing interval
UE user equipment
UL uplink
WLAN wireless local area network

What is claimed is:

1. A method for operating a user terminal, the method comprising:
   obtaining a resource allocation assignment including at least an assignment of a resource allocation amount of granted resources for transmission,
   allocating resources out of the granted resources to logical channels, for which data is available for transmission, according to a priority and a prioritized bit rate of each logical channel;
   calculating a metric indicative of a result of the resource allocation in terms of at least one of requirements of the prioritized bit rates of the logical channels and the available data of the logical channels; and at least one of:
      sending the calculated metric to an access node, and obtaining from the access node a modified resource allocation assignment including at least one of an assignment of a resource allocation amount of granted resources for transmission and an assignment of a resource sharing balance of granted resources between devices involved in the transmission, and
      sending the calculated metric to a device involved in the transmission, and obtaining from said device a modified resource allocation assignment including an assignment of a resource sharing balance of granted resources with said device; and/or receiving from a device involved in the transmission the metric of said device, establishing a modified resource allocation assignment including an assignment of a resource sharing balance of granted resources with said device based on the calculated metric and the received metric, and providing the modified resource allocation assignment to said device.

2. The method according to claim 1, wherein
the resource allocation comprises a first round of allocating resources to the logical channels in a decreasing order of priority of each logical channel up to a prioritized bit rate of each logical channel,
the method further comprises determining whether, as a result of the first round of resource allocation, the granted resources are sufficient for fulfilling the requirements of the prioritized bit rates or the available data of the logical channels, and
the metric calculation comprises summing a data amount of the logical channels, which is not allocated by the first round of resource allocation, and which is necessary to be allocated for fulfilling the requirements of the prioritized bit rates or the available data of the logical channels, if it is determined that the granted resources are not sufficient.

3. The method according to claim 2, wherein, if it is determined that the granted resources are sufficient,
the resource allocation comprises a second round of allocating resources, which are not allocated by the first round of resource allocation, to the logical channels in a decreasing order of priority of each logical channel, and
the metric calculation comprises summing a data amount of the logical channels, which is allocated by the second round of resource allocation.

4. The method according to claim 3, wherein at least one of the following applies
the metric calculation further comprises at least one of averaging the summed data amount of the logical channels and forming a ratio with an amount of the granted resources,
the granted resources are represented by a protocol data unit of medium access control, and an amount of the granted resource is represented by the allocatable size of the protocol data unit of medium access control, and
the requirements of the prioritized bit rates or the available data of the logical channels are fulfilled when the prioritized bit rate is provided for each logical channel where the available data for transmission equals or exceeds a data amount according to the prioritized bit rate, and all of the available data is allocated for each logical channel where a data amount according to the prioritized bit rate exceeds the available data for transmission.

5. The method according to claim 1, wherein
at least one of the following applies:
the transmission is to be part of a device-to-device communication between terminals or an uplink communication between a terminal and an access node, and
the terminal is configured for operation in accordance with long-term evolution specifications.

6. An apparatus for operating a user terminal, the apparatus comprising:
an interface configured for communication with at least another apparatus, and
a processor configured to
obtain, via the interface, a resource allocation assignment including at least an assignment of a resource allocation amount of granted resources for transmission,
allocate resources out of the granted resources to logical channels, for which data is available for transmission, according to a priority and a prioritized bit rate of each logical channel,
calculate a metric indicative of a result of the resource allocation in terms of at least one of requirements of the prioritized bit rates of the logical channels and the available data of the logical channels; and at least one of:
send, via the interface, the calculated metric to an access node, and obtain, from the access node via the interface, a modified resource allocation assignment including at least one of an assignment of a resource allocation amount of granted resources for transmission and an assignment of a resource sharing balance of granted resources between devices involved in the transmission, and
send, via the interface, the calculated metric to a device involved in the transmission and obtain, from said device via the interface, a modified resource allocation assignment including an assignment of a resource sharing balance of granted resources with said device; and/or receive via the interface from a device involved in the transmission the metric of said device, establish a modified resource allocation assignment including an assignment of a resource sharing balance of granted resources with said device based on the calculated metric and the received metric, and provide via the interface the modified resource allocation assignment to said device.

7. The apparatus according to claim 6, wherein the processor is configured to
perform a first round of allocating resources to the logical channels in a decreasing order of priority of each logical channel up to a prioritized bit rate of each logical channel,
determine whether, as a result of the first round of resource allocation, the granted resources are sufficient for fulfilling the requirements of the prioritized bit rates or the available data of the logical channels, and
sum, for metric calculation, a data amount of the logical channels, which is not allocated by the first round of resource allocation, and which is necessary to be allocated for fulfilling the requirements of the prioritized bit rates or the available data of the logical channels, if it is determined that the granted resources are not sufficient.

8. The apparatus according to claim 7, wherein, if it is determined that the granted resources are sufficient, the processor is configured to
perform a second round of allocating resources, which are not allocated by the first round of resource allocation, to the logical channels in a decreasing order of priority of each logical channel, and
sum, for metric calculation, a data amount of the logical channels, which is allocated by the second round of resource allocation.

9. The apparatus according to claim 8, wherein at least one of the following applies
the processor is configured to, for metric calculation, at least one of average the summed data amount of the logical channels and form a ratio with an amount of the granted resources,
the granted resources are represented by a protocol data unit of medium access control, and an amount of the granted resource is represented by the allocatable size of the protocol data unit of medium access control, and
the requirements of the prioritized bit rates or the available data of the logical channels are fulfilled when the prioritized bit rate is provided for each logical channel where the available data for transmission equals or exceeds a data amount according to the prioritized bit rate, and all of the available data is allocated for each logical channel where a data amount according to the prioritized bit rate exceeds the available data for transmission.

10. The apparatus according to claim 9, wherein at least one of the following applies:
the transmission is to be part of a device-to-device communication between terminals or an uplink communication between a terminal and an access node, and
the apparatus is configured for operation in accordance with long-term evolution specifications.

11. A non-transitory computer-readable memory storing comprising computer-executable code which, when executed by a processor causes a user terminal hosting the memory and processor to at least:
obtain a resource allocation assignment including at least an assignment of a resource allocation amount of granted resources for transmission,
allocate resources out of the granted resources to logical channels, for which data is available for transmission, according to a priority and a prioritized bit rate of each logical channel,
calculate a metric indicative of a result of the resource allocation in terms of at least one of requirements of the prioritized bit rates of the logical channels and the available data of the logical channels; and at least one of:
send the calculated metric to an access node, and obtain from the access node a modified resource allocation assignment including at least one of an assignment of a resource allocation amount of granted resources for transmission and an assignment of a resource sharing balance of granted resources between devices involved in the transmission, and
send the calculated metric to a device involved in the transmission, and obtain from said device a modified resource allocation assignment including an assignment of a resource sharing balance of granted resources with said device; and/or receiving from a device involved in the transmission the metric of said device, establish a modified resource allocation assignment including an assignment of a resource sharing balance of granted resources with said device based on the calculated metric and the received metric, and provide the modified resource allocation assignment to said device.

* * * * *